United States Patent [19]

Tamura et al.

[11] 4,154,517
[45] May 15, 1979

[54] CAMERA WITH MEANS FOR COORDINATING APERTURE AND FOCUS ADJUSTMENTS

[75] Inventors: Shuichi Tamura, Yokohama; Kazuya Hosoe, Machida; Hideo Yokota, Tokyo, all of Japan

[73] Assignee: Canon Kabushiki Kaisha, Tokyo, Japan

[21] Appl. No.: 831,121

[22] Filed: Sep. 7, 1977

[30] Foreign Application Priority Data

Sep. 8, 1976 [JP] Japan .................................. 51-107398
Sep. 8, 1976 [JP] Japan .................................. 51-107399

[51] Int. Cl.² ......................... G03B 7/08; G03B 13/18
[52] U.S. Cl. ...................................... 354/25; 354/196; 354/198
[58] Field of Search ................. 354/25, 195, 196, 197, 354/198, 199, 163, 40, 23 R; 352/140; 355/56

[56] References Cited

U.S. PATENT DOCUMENTS 3,618,499  11/1971  Harvey ................................. 354/40
3,962,707   6/1976  Galbraith, Jr. ................... 354/196 X

*Primary Examiner*—Michael L. Gellner
*Attorney, Agent, or Firm*—Toren, McGeady and Stanger

[57] ABSTRACT

A camera is provided that has an automatic focus detector and a manually operable focus adjustment device, in which the focus adjustment device can be set at a predetermined position or range falling outside of an ordinary focus adjusting range. At the same time a coordinating device is provided which functions to secure an appropriate depth of field (or a hyper focal range) by coordinating the focus adjustment and the exposure aperture adjustment when the focus adjustment device is set at the predetermined position or range. Thus even in a case when the focus detector can not function effectively, practically satisfactory photographing can be done by the action of the coordinating device.

In a preferred example of the present invention the focusing condition of a photo-taking lens system is automatically adjusted according to an exposure aperture value (i.e. f-stop value) by the action of the coordinating device in a condition in which the focus adjustment device is set at the predetermined position.

In another preferred example of the present invention, the size of the exposure aperture is automatically limited to a predetermined aperture size or smaller according to the set position of the lens system by the action of the coordinating device in a condition in which the focus adjustable device is set at a predetermined position or range.

15 Claims, 13 Drawing Figures

(a) (ABSOLUTE VALUE SUMMING CIRC. 54 OUTPUT)

(b) (DIFFERENTIATING CIRC. 37 OUTPUT)

(c) (SWITCHING CIRC. 38 OUTPUT)

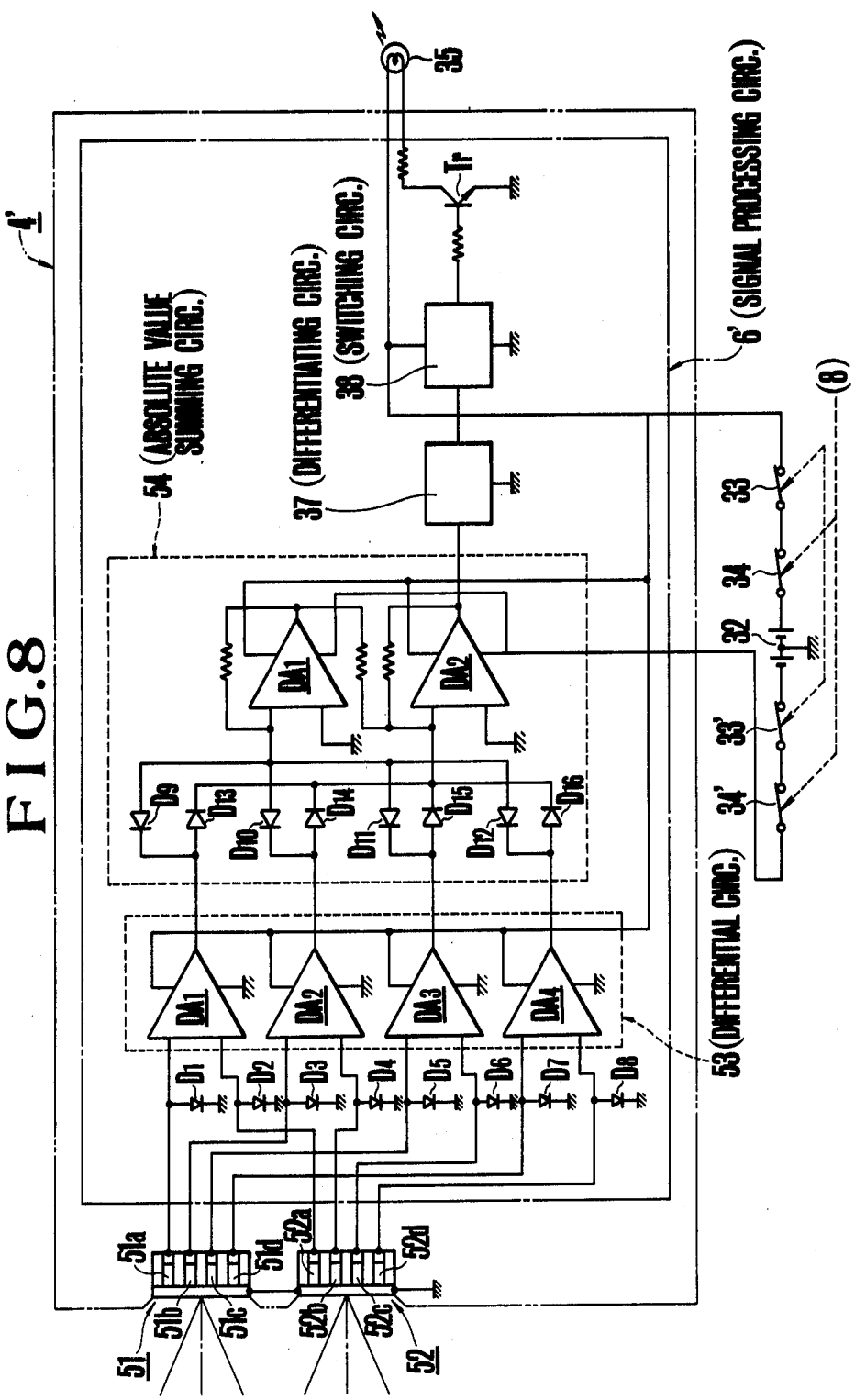

CAMERA WITH MEANS FOR COORDINATING APERTURE AND FOCUS ADJUSTMENTS

BACKGROUND OF THE INVENTION

1. Field of the Invention

The present invention relates to a camera and specifically to improvements in a camera having an automatic focus detection device.

2. Description of the Prior Art

Various types of automatic focus detection devices or automatic focus adjusting devices for a camera have been proposed heretofore and some of them have been embodied in commercial products being built in cameras sold in the market.

However, when these various devices including those being used in commercially sold products are carefully examined, it is revealed that a focus detecting accuracy of such devices is not always good, and there are many instances where accurate focus detection can not be done depending on photographing conditions.

For example, there is a device of passive type employing one or more photoelectric elements among said various types of devices, but in such a device when the object brightness lowers or the contrast pattern of an object is complicated accurate focusing detection can no longer be expected.

Also there is an active type device which has a light beam projector to project light beam onto an object and one or more photoelectric elements to receive the light beam reflected from the object, but light reflecting planes of an ordinary object are rough and unsmooth in most cases, further the intensity of light reaching a certain point is inversely proportional to a square of a distance thereto, therefore it is very difficult to always secure sufficient intensity of the reflected light beam impinging into the photoelectric elements in said device, thus such cases are apt to take place that accurate focus detection can not be achieved.

Therefore, what is desired when such an automatic focus detection device or automatic focus adjusting device is actually built in a camera is to provide some form of an auxiliary device which can take place of said automatic device when the automatic focus detection function thereby is not satisfactorily done by said reasons, as a means to relieve the situation so that a practically satisfactory photographing can be done automatically.

That is, unless such auxiliary device is provided, a user of such camera having said automatic focus detection or automatic focus adjusting device built therein will have no choice but is required to make such troublesome handling as judging a distance to the object with his eyes and then making the focus adjustment using a distance scale on a photo-taking lens when said automatic device does not function effectively, thus advantages of said automatic focusing detection device are totally lost, further such automatic function constitutes a difficulty in photo-taking in some cases.

In view of the above, such camera has been proposed as having an automatic focus adjusting device and further having a coordinating means to coordinate focus adjustment with exposure aperture adjustment.

That is, a camera proposed by U.S. Pat. No. 3,618,499 (corresponding German DT-OS No. 20 15 899) is a one, in which a photo-taking lens is so made as being shifted continuously by an urging force of a spring member from its nearest photographing distance position (for example a position corresponding to 1.2 meters) toward its infinite photographing distance position, and at the same time an automatic focus adjusting device of an active range finding type is so provided as initiating its action to detect an object distance in response to said shifting of the taking lens and latching the taking lens when the taking lens reaches such photographing distance position as corresponding to the object distance in a course of said shifting. Further in this camera, an exposure meter to respond to the output of a light measuring photoelectric element, and an aperture adjusting means to adjust a diaphragm means according to an aperture value (f-stop value) indicated by said exposure meter are provided, and a means is provided at a part of said aperture adjusting means to limit an adjustable range of focus of said taking lens according to the exposure aperture value, wherein the adjustable range of focus of the taking range is adjusted stepwise according to the aperture value by an action of said limiting means in such manner as for example at a range of 1.2 meters to infinite in case of exposure aperture value of f3.2 (which means the maximum aperture size of the camera), also at a range of 1.2 meters to 7.2 meters in case of f5.6, and at a range of 1.2 meters to 3.6 meters in case of f11 (which means the minimum aperture size of the camera). Here, the figures shown above are approximate data when the focal length of a photo-taking lens is 44 mm.

Therefore, in this type of camera, the effective focus adjusting range of an automatic focus adjusting device is limited in such a manner as at a range of 1.2 meters to infinite in case of f3.2, and at a range of 1.2 meters to 7.2 meters in case of f5.6, while at a range of 1.2 meters to 3.6 meters in case of f11, according to an exposure aperture value, and in an event said focus adjusting device fails to detect an object distance within said ranges in actual photographing, the taking lens wil be automatically set according to an exposure aperture value for example at a position corresponding to an infinite distance in case of f3.2, and at a position corresponding to a distance of 7.2 meters in case of f5.6, while at a position to a distance of 3.6 meters in case of f11.

That is, such camera takes an advantage of characteristics of the so-called hyper focal range of a lens that is all objects within a range from a certain limited distance to the infinite distance can be focused with a permissible degree of sharpness, wherein for example when the exposure aperture value is f3.2 in a lens having a focal length of 44 mm, the hyper focal distance (a photographing distance to which the lens is to be match for obtaining the above mentioned hyper focal range) is about 13.5 meters (which is already equivalent to infinite in case of ordinary phototaking lens) wherein the hyper focal range at this time is about 6.75 meters to infinite, and in case of f5.6, the hyper focal distance is 7.2 meters and the hyper focal range at that time is 3.6 meters to infinite, further the hyper focal distance in case of f11, is 3.6 meters and the hyper focal range at that time is 1.8 meters to infinite. That is, in this camera, when the automatic focus adjusting device fails to detect the object distance within each effective focus adjusting range mentioned above, for example if the exposure aperture value is f3.2, the taking lens is set at a position corresponding to infinite, and then objects within a range of 6.75 meters to infinite can be focused with permissible degree of sharpness, and if it is f5.6, the taking lens is set at a position corresponding to 7.2 meters, and then objects within a range of 3.6 meters to infinite can be focused with permissible degree of sharpness, further, if it is f11, the taking lens is set at a position corresponding to 3.6 meters, then objects within a range of 1.8 meters to infinite can be focused with permissible degree of sharpness.

As has been explained above, a camera proposed above has a means of relief for a case when the automatic focus adjusting device can not effectively function, by utilizing a combination of the so-called hyper focal range of a lens and an exposure aperture size thereof, but the system mentioned above in this camera is apparently unreasonable in the following points.

That is, since the adjustable range of focus of a lens is singularly limited according to the exposure aperture value, useful properties specifically provided at the automatic focus adjusting device are left alone in vein, especially under such a photographing condition that the exposure aperture size becomes comparatively smaller, and the significance for providing the automatic focus adjusting device is more or less halved.

For example, even when an object is at a position of 5 meters further the automatic focus adjusting device is in a state being able to sufficiently detect said object distance, if the exposure aperture value is indicated at f11 by the exposure meter, the taking lens will be set at a position corresponding to 3.6 meters by the action of said limiting means even if the automatic focus adjusting device is in such state as being able to detect the object distance with sufficient accuracy, thus the significance of providing said automatic focus adjusting device is totally lost.

And in this case while the hyper focal range of 1.8 meters to infinite can be obtained by setting the taking lens at the position corresponding to 3.6 meters, said hyper focal range is nothing but a range in which quasi focusing can be obtained, therefore even if the hyper focal range of 1.8 meters to infinite can be obtained by setting the taking lens at the position corresponding to 3.6 meters in case the exposure aperture value is f11, only an object at the position of 3.6 meters can be precisely focused but objects at other positions are out of focus in an exact sense of words.

Therefore, it is important in this kind of camera to provide such design that the above mentioned limiting means that is a coordinating means for coordinating the focus and exposure aperture adjustments is utilized only as an auxiliary relief means in case the automatic focus detecting or adjusting device can not effectively function, that is such design that the effective focus detecting or adjusting range of the automatic focus detecting or adjusting device is always secured within a range from the minimum distance allowing a photographing to an infinite distance in order to utilize the function of said device to its maximum extent in an ordinary case, and only in case when the automatic focus detecting or adjusting device can not effectively function in photographing, said coordinating means can be utilized as the relief means therefor.

SUMMARY OF THE INVENTION

The present invention is made in view of the above, and, prime object thereof is to provide a unique structure and set up of a camera in which an above mentioned automatic focus detecting device is provided and further a coordinating means for coordinating the focus and exposure aperture adjustment is provided, and in an ordinary case, an effective focus detecting range of said automatic focus detecting device is secured at a range from its minimum distance allowing photographing to an infinite distance by a very simple set up for utilizing the function of said automatic focus detecting device to its maximum extent, and only when said automatic focus detecting device can not effectively function in photographing, said coordinating means can be utilized.

And to achieve said object, such unique structure and set up of a camera is proposed in the present invention that a manually operable focus adjusting means is so made as can be set at a predetermined position or range falling outside of an ordinary focus adjusting range and at a same time said coordinating means is operatively connected to said focus adjusting means so that said coordinating means can so function as securing an appropriate depth of field or hyper focal range only when said focus adjusting means is set at said predetermined position or range.

Another object of the present invention is to provide a more concrete form of structure and set up suitable to achieve the above mentioned prime object of the present invention on a form of a coordination of the adjustments of focus and of exposure aperture.

And in connection with said object, such structure and set up are proposed in some of preferable embodiments of the present invention that said coordinating means is so constructed as to engage with a part of a diaphragm device and automatically adjust the focusing of a taking lens means corresponding to an exposure aperture value, independent of said manually operable focus adjusting means, thereby when said manually operable focus adjusting means is set at said predetermined position, said taking lens means engages with said coordinating means and then is automatically adjusted so as to secure an appropriate hyper focal range within a certain range by said coordinating means that is according to the exposure aperture value.

Also such structure and set up are proposed in some other embodiments of the present invention that said coordinating means is so constructed that when said manually operable focus adjusting means is set at said predetermined position or range, the coordinating means engages with a part of said taking lens means and limits an exposure aperture size to be regulated by a diaphragm device to a predetermined aperture size or smaller according to the set position of the lens means, thereby when said manually operable means is set at said predetermined position, the exposure aperture size to be regulated by the diaphragm device is limited to said predetermined aperture size or smaller according to the set position of the lens means, thus appropriate hyper focal range is secured.

Further objects and characterizing features of the present invention will be made clear from the descriptions given below utilizing drawings of examples attached hereto.

BRIEF DESCRIPTION OF THE DRAWINGS

Now explanations will be made on the attached drawings of some preferable examples of the present invention, in which:

FIGS. 1 to 5 show a first example of a camera according to the present invention, wherein FIG. 1 is an oblique view to diagrammatically show a set up of important parts relating to the present invention, FIG. 2 is a plan to show diagrammatically an internal structure of a camera shown in FIG. 1 as it is viewed from an upper direction thereof, FIG. 3 is a diagram to show a basic set up of a focus detection device to detect sharpness of a photoelectric type provided in a camera mentioned above, FIG. 4 is a circuit diagram to show a basic set up of a signal processing circuit in said focus detecting device, and FIG. 5 are output waveform diagrams to show a manner of charge in output signal of each circuit block of the signal processing circuit shown in FIG. 4.

FIGS. 6 to 9 show a second example of a camera according to the present invention in which similar improvements as in said first example are applied to a camera having a passive range finding type focus detection device, in which FIG. 6 is a plan to show diagrammatically an internal structure of said camera as it is viewed from an upper direction thereof as in FIG. 2, and FIG. 7 is an oblique view to show diagrammatically details of a set up of said passive range finding type focus detection device provided at said camera, while FIG. 8 is a circuit diagram to show a basic set up of a signal processing circuit in the focus detection device shown in FIG. 7, and FIG. 9 shows output waveform diagrams to show a manner of change in output of each circuit block in the signal processing circuit shown in FIG. 8.

FIGS. 10 to 12 show a third example of a camera according to the present invention, in which FIG. 10 is an oblique view to show diagrammatically a set up of important parts relating to the present invention, and FIG. 11 and FIG. 12 are plans to show diagrammatically an internal structure of a camera shown in FIG. 10 as it is viewed from an upper direction thereof, wherein FIG. 11 is to show functional state in an ordinary focus adjustment of said camera, while FIG. 12 is to show a functional state at a time when focus detection can not work properly.

DETAILED DESCRIPTIONS OF THE PREFERRED EMBODIMENTS

First, explanations will be made on the first example of the present invention referring to FIGS. 1 to 5.

Figure 3:
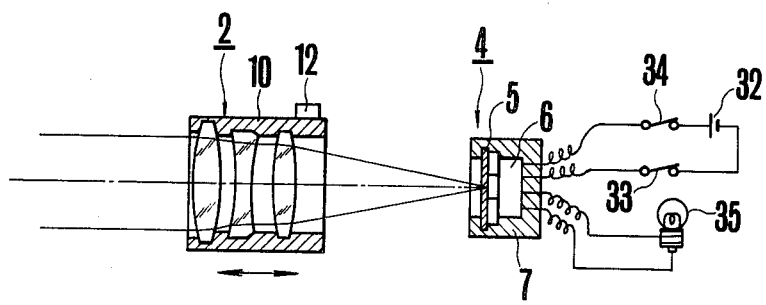

In said drawings, what is shown as 1 is a photographing optical system, 2 is an imaging optical system for focus detection, and a film 3 and a unit 4 for focus detection are so provided in the rear of said systems respectively that the relative optical relationship of each of them has a prescribed relationship. And said detection unit 4 consists of a photo-electric conversion element to generate such output as corresponding to a change in sharpness of an image and a signal processing circuit 6 being integrated as much as possible to process the output of said element 5, wherein said element 5 and circuit 6 are encapsulated in one casing 7, as shown in FIG. 3. Said photoelectric conversion element 5 may be, for example, a photo-conductive element such as CdS or CdSe, etc., or plural number of substantially independent fine photo-voltaic elements, or may be a solid image sensor element such as CCD (charge coupled device) or a photo-diode array, and in any event it may be one by which the maximum or minimum output further pulse output can be obtained through a suitable signal processing circuit at an in-focus condition of the optical system.

What is shown as 8 is a manual setting member for focus adjustment, which is so made that two cam grooves 8a, 8b for focus adjustment are bored at said member 8, and a pin 11 planted on an outer casing 9 of the photographing optical system 1 and a pin 12 planted on an outer casing 10 of the focus detection optical system 2 are fitted into said grooves 8a, 8b respectively, and said optical systems 1 and 2 can be shifted to a direction of their optical axis by shifting said setting member 8 by an operating part 8c thereof. What are shown as 13, 14 are springs to bias said photographing optical system 1 and said focus detection optical system 2 respectively to the direction of the film 3 and the detection unit 4 respectively.

What are shown as 15, 16 are two diaphragm plates, which have photo-taking diaphragm aperture openings 15a, 16a, and diaphragm aperture openings 15b, 16b for photo-sensing, respectively and are connected to an arm 17 being axially supported by an axle 18 at an appropriate part of a camera main body in a rotatable manner, wherein they are so made as being shifted by the rotation of said arm 17 to directions opposing to each other to define a photo-taking aperture opening and a photo-sensing aperture opening, respectively, by their diaphragm aperture openings 15a, 16a and 15b, 16b. What is shown as 40 is a light receiving element for photo-sensing provided in rear of said openings 15b, 16b.

What is shown as 19 is a spring to bias said diaphragm plates 15, 16 to a direction defining the maximum aperture and said spring 19 works on the diaphragm plate 15.

What is shown as 20 is a diaphragm regulating member to regulate said diaphragm plates 15, 16 resisting said spring 19, and has an arm part 20a engaged with a projection 15c on said diaphragm plate 15, and can be operated by its operating part 20b. What is shown as 21 is a movable member which works on said pin 11 at a time when focus detection can not be done to regulate the photographing optical system 1 according to the degree of regulating the diaphragm plates 15, 16, and has a pin 22 at its tail end part, further is axially attached to said setting member 8 for focus adjusting by an axle 23 in a rotatable manner, and is biased to clockwise direction in the drawing around said axle 23 by a spring 24.

Figure 1:
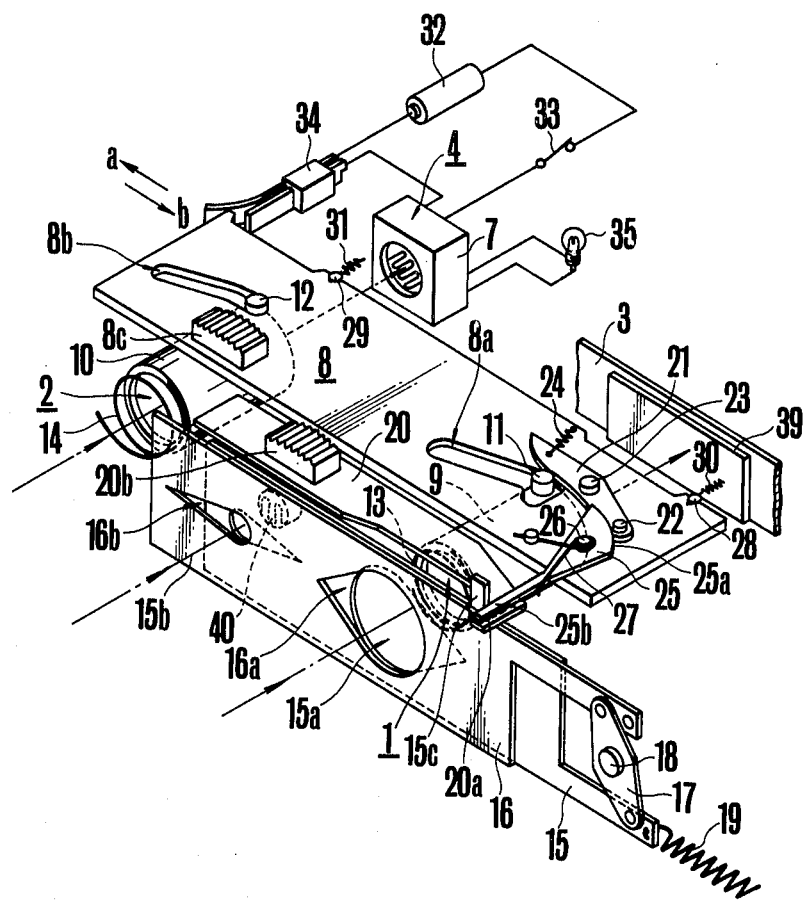
Figure 2:
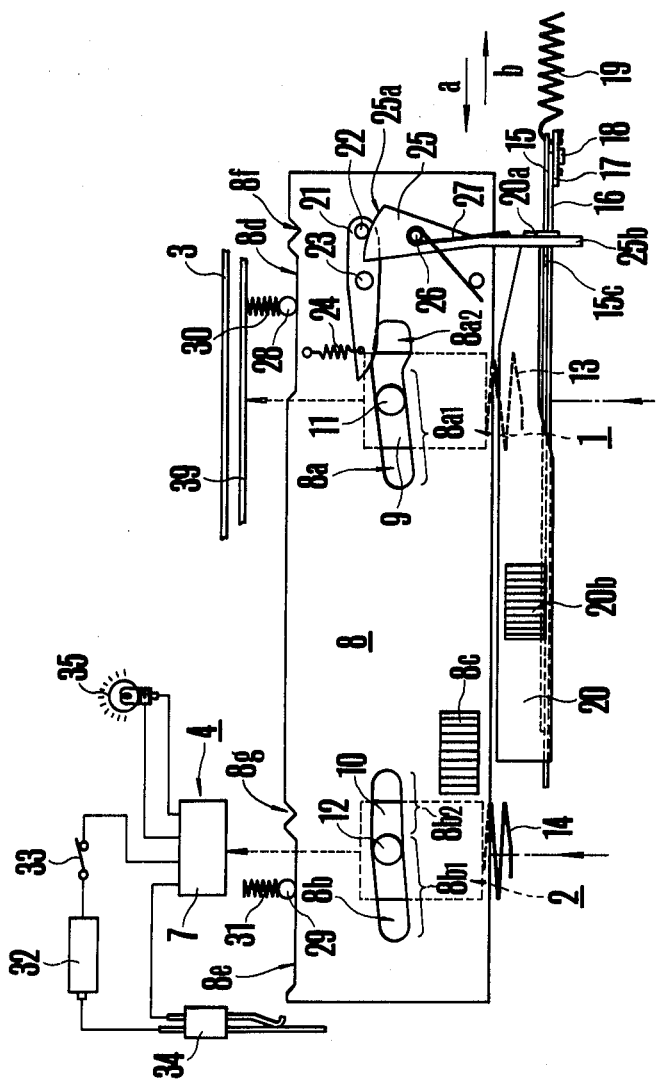

What is shown as 25 is a cam member to regulate an amount of rotation of said movable member 21 according to the degree of regulating said diaphragm plates 15, 16, and has a cam plane 25a engaged with a pin 22 of said movable member 21, further is axially attached to said setting member 8 by an axle 26 in a rotatable manner, wherein said member is so biased to clockwise direction in FIGS. 1 and 2 around the axle 26 that its cam plane 25a contacts the pin 22 of said movable member 21 and the arm part 25b at its tail end contacts the projection 15c of said diaphragm plate 15, respectively. And the working power of said spring 27 is so set as stronger than a synthesized working power of the spring 13 working on the photographing optical system 1 and the spring 24 working on the movable member 21, on the other hand the working power of the spring 19 working on the diaphragm plate 15 is so set as stronger than that of said spring 27.

Here, explanations will be made on a structure of the cam grooves 8a, 8b at the setting member 8 for focus adjustment.

As shown in detail in FIG. 2, said cam grooves 8a, 8b have oblique groove parts 8a₁, 8b₁ to set said optical systems 1, 2 from the nearest distance position to the infinite distance position having certain corresponding relationship, and in that case, an escapement groove part $8a_2$ to have said photographing optical system 1 settable between the infinite distance position and a prescribed limited distance position for example about 2 to 3 meters by said movable member 21 is continuously provided at the cam groove 8a to set the photographing optical system 1 in a manner being adjacent to an end part at the infinite distance position setting side of the oblique groove $8a_1$, when said setting member 8 is shifted from the infinite distance setting position further to the direction of arrow a in the drawing, and on the other hand, a parallel groove part $8b_2$ to retain the detection optical system 2 at the infinite distance position at a time of the above mentioned operation is provided at the cam groove 8b to set said focus detection optical system 2 in such manner as continuous to an end part of the oblique groove part $8b_1$ at the infinite distance setting side. And said oblique groove parts $8a_1$, $8b_1$ are so formed with a mutually corresponding relationship that the photographing optical system 1 is just set an in-focus position against an object at a time when the sharpness of an image of said object formed on a light receiving plane of the photoelectric conversion element 5 at the detection unit 4 by the detection optical system 2 reaches its maximum level, in a course of setting of both optical systems 1, 2.

Also, said movable member 21 is provided at such position as being able to be engaged with said pin 11 when said setting member 8 is shifted from the infinite distance setting position further to the direction of an arrow a in the drawing, that is when the escapement part $8a_2$ in said cam groove 8a receives the pin 11 connected to said photographing optical system 1.

Therefore, when the setting member 8 is shifted further to the direction of arrow a in the drawing from the infinite distance setting position, the photographing optical system 1 is set according to the position of the movable member 21. That is, the photographing optical system 1 is set at a position corresponding to the degree of regulating the photographing aperture at the diaphragm plates 15, 16. This means that a change of a so-called hyper focal range of an optical system according to a diaphragm aperture value is utilized, and in this example, when focus detection can not be done, an object image with such degree of sharpness as permissible in most practical photographings can be formed on a film surface by setting a photographing optical system at such hyper focal distance as corresponding to a diaphragm aperture value.

What are shown as 28, 29 are click balls which are elastically pressed by springs 30, 31, respectively, and slidingly contact with recess parts 8d, 8e at a side part of said setting member 8, and are positioned at said recess parts 8d, 8e, respectively, as said setting member 8 is set in an ordinary manner, but are dropped in the notched parts 8f, 8g, respectively, thereof when said setting member 8 is shifted from its infinite distance setting position further to the direction of arrow a in the drawing as a focus detection can not be done, so that said setting member 8 is retained at said position.

What is shown as 32 is a power source for said detection unit 4, and 33 is a power source switch, and 34 is a stopping switch for use at a time when focus detection can not be done, to open a power supply path to said detection unit 4 to stop the function of said unit 4 by being released by said setting member 8 when the setting member 8 is shifted from its infinite distance setting position further to the direction of arrow a in the drawing and is retained by the click balls 28, 29. By providing such stopping switch 34, the signal from said detection unit 4 is completely interrupted and the above mentioned auxiliary device can be activated without being confused by useless signal at a time when the focus detection can not be done, and at a same time useless wasting of the power source 32 can be prevented. What is shown as 35 is a lamp to indicate focus detection, being controlled by a signal processing circuit 6 within said detection unit 4 and being lighted for a prescribed period of time when said optical systems 1, 2 are set at focusing position against an object, for indicating a focusing state.

Figure 4:
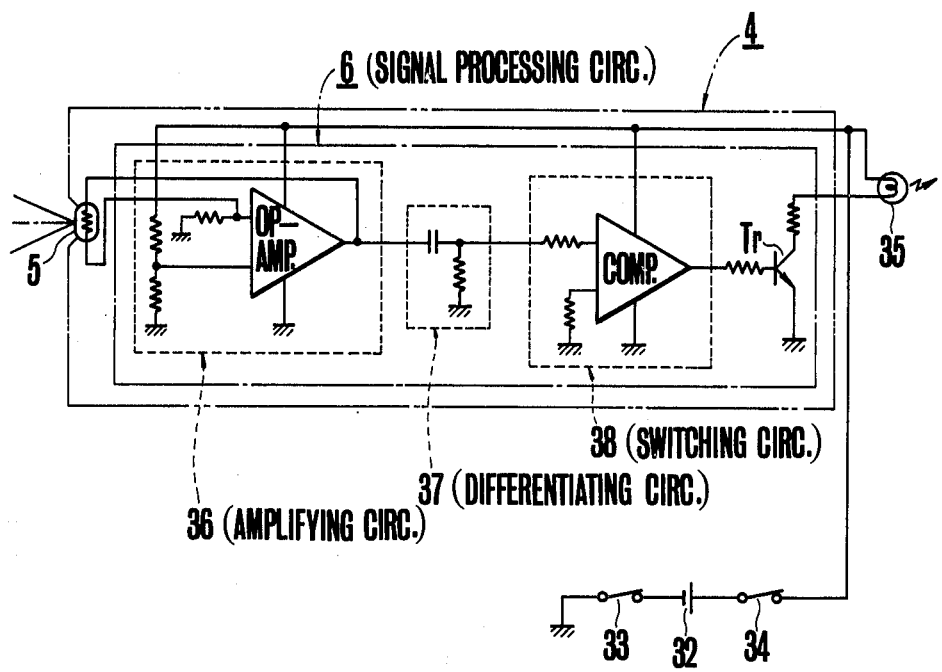

A basic set up of the signal processing circuit 6 in the detection unit 4 is as shown in FIG. 4.

Figure 5:
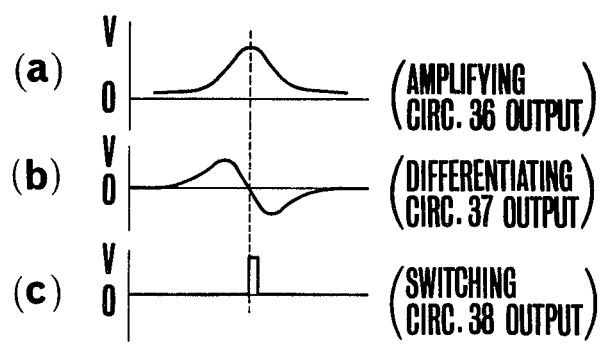

That is, in said drawing, what is shown as 36 is an amplifier circuit to amplify the output of said photoelectric conversion element 5, amplifying the output of said element 5 at a time of focus detection, and as shown by (5) in FIG. 5, generating the output to show such change as reaching the maximum value at focusing point. What is shown as 37 is a differentiation circuit to differentiate the output of said amplifier circuit 36, and generating such output as having said polarity suddenly changed at said focusing point as shown by (5) in FIG. 5. What is shown as 38 is a switching circuit to control the lighting and putting off of said indication lamp based on the output of said differentiation circuit 37, and to output pulse-like signal at a focusing point as shown by (c) in FIG. 5 for turning on the transistor Tr, thereby lighting said lamp 35 for a short period of time, to indicate that the optical systems 1 and 2 have reached the focusing point.

Also, since these circuits are all of well known type, the drawing shows detailed set up thereof, while detailed explanations thereof will be omitted without hindering the apprehension of the same.

And, while not being shown in the drawing, said diaphragm setting member 20 is retained in a slidable manner by such means for example as a sheet spring, etc. which can resist the working power of the spring 19 working on said diaphragm plate 15. Also what is shown as 39 is a shutter, which is initiated by a release button not being shown in the drawing. Also said shutter 39 may be so made as having its working time controlled according to the output of said light receiving element for photo-sensing.

Next, explanations will be made on a function of a camera having the above mentioned set up.

First, the diaphragm setting member 20 is operated by its operating part 20b to shift two diaphragm plates 15, 16, thereby the photographing aperture opening and the photo-sensing aperture opening are set, then the power source switch 33 is closed in a state in which the camera is pointed to a desired object and the focus adjusting and setting member 8 is operated by its operating part 8c within a range of the oblique groove parts $8a_1$, $8b_1$ of the cam grooves 8a, 8b, that is within such range that the click balls 28, 29 are not dislocated out of the recess parts 8d, 8e thereof, then the photographing optical system 1 and the focus detection optical system 2 are shifted by said oblique groove parts $8a_1$, $8b_1$ along respective optical axis. And when both optical systems 1 and 2 are focused against an object, the switching circuit 38 at the signal processing circuit 6 within the detection unit 4 is activated and the lamp 35 is lighted for a short period of time to indicate that both optical systems 1 and 2 are focused.

Therefore, if the setting member 8 is stopped at a time when the lamp 35 is lighted, both optical systems 1 and 2 are retained at their respective focused point.

Then when a release button is operated, the shutter 39 is activated and a clear object image will be formed on the film 3.

On the other hand, when the focus detection by the detection unit 4 is incomplete at the time of said focus adjusting, and the indication of the focusing state by the lamp 35 is not done, the setting member 8 is shifted from its infinite distance setting position further to the direction of an arrow a shown in FIGS. 1 and 2. By this, the setting member 8 is retained at said position to have the click-balls 28, 29 dropped in their respective notched parts 8f, 8g, and the escapement groove part 8$a_2$ and the parallel groove part 8$b_2$ will receive the pin 11 connected to the photographing optical system 1 and the pin 12 connected to the focus detection optical system 2, respectively, and at a same time the movable member 21 will engage with the pin 11.

Therefore if a diagram aperture is set beforehand for photographing by the diaphragm regulating member 20, or a diaphragm aperture is set by the diaphragm regulating member 20 after the setting member 8 is set at the above mentioned position, the cam member 25 is shifted according to the degree of regulating a diaphragm aperture at that time and the movable member 21 is rotated corresponding therewith, then the photographing optical system 1 is regulated along its optical axis according to the amount of rotation of said rotating member 21, in other words, according to the degree of regulating the diaphragm aperture at the diaphragm plates 15, 16, thus finally said system 1 will be set at a hyper focal distance position determined by the diaphragm aperture, and an object image with such degree of clearness as permissible for practical use will be obtained at a position corresponding to a film surface.

In this case, an amount of cam lift of the cam plane 25$a$ at said cam member 25 is so designed that for example, a focal point is matched with an object at a comparatively long distance (for example about 10 meters) when the diaphragm aperture is close to a fully opened one, therefore a depth of field is small, also that a focal point is matched with an object at a short distance (for example about 2 to 3 meters) when the diaphragm aperture is small therefore a depth of field is large.

That is, what is explained above may be elaborated in such manner that when the focal length of the photographing optical system 1 is 26 mm, since the hyper focal distance of said optical system at a time when an exposure aperture value is f2.8 is about 11.4 meters, the hyper focal range at that time becomes 5.7 meters to infinite if the photographing optical system 1 is set at a position corresponding to said 11.4 meters, thus a focus will be set at objects positioned between said 5.7 meters and infinite with permissible degree of sharpness.

Also, similarly, since the hyper focal distance of said optical system at a time of f5.6 is about 4.8 meters and the hyper focal range at that time becomes 2.4 meters to infinite, when the exposure aperture value is f5.6, if the photographing optical system 1 is set at a position corresponding to 4.8 meters, focus will be set at objects between 2.4 meters and infinite with permissible degree of sharpness.

Further, since the hyper focal distance of said optical system at a time of f11 is about 2.4 meters and the hyper focal range at this time becomes 1.2 meters to infinite, if the photographing optical system 1 is set at a position corresponding to 2.4 meters when the exposure aperture value is F11, focus will be set at objects between 1.2 meters and infinite with permissible degree of sharpness.

Therefore, if the amount of cam-lift at the cam plane 25$a$ of said cam member 25 is so designed that said photographing optical system 1 can be set at a hyper focal distance determined by a combination of the focal length of said photographing optical system 1 and the exposure aperture size to be regulated by the diaphragm plates 15, 16, it will become more effective as an auxiliary means as a relief for a case when focus detection can not be made.

Also, in a state the setting member 8 is set the above mentioned position, the detection optical system 2 is retained at an infinite distance position by the parallel groove part 8$b_2$ at the cam groove 8$b$, also the stopping switch 34 is opened and the detection unit 4 has its action stopped.

As has been explained above, in the first example of the present invention shown in FIGS. 1 to 5, the fact that a hyper focal distance of an optical system changes according to the degree of regulating a diaphragm aperture is utilized to allow such photographing as permissible for practical purposes in most cases by automatically setting a photographing optical system at such hyper focal distance position as corresponding to a diaphragm aperture value at a time when an automatic focus detecting device does not function, and especially as its structure is very simplified, it can be made with a low cost, thus very useful effects can be obtained as it is applied to a middle class camera.

Next, explanations will be made on a second example of the present invention referring to FIGS. 6 to 9. In this second example, similar improvements as in said first example are applied to a camera having an automatic focus detecting device of a passive range finding type, and the components shown in FIGS. 6 to 8 with same numbers and marks as those in FIGS. 1 to 4 are totally same as those in said first example, therefore explanations hereinafter will be made on a set up being different from that in the example 1.

What is shown as 41 is a mask plate fixedly positioned at a front plane of a camera having two openings 41$a$, 41$b$ formed at positions being separated by a prescribed distance.

What is shown as 42 is a reflective mirror fixedly positioned at a position facing to the first opening 41$a$ with an inclination of 45 degrees against said mask plate 41 in a rear of said plate 41. And 43 is a movable reflective mirror provided at a position facing to the second opening 41$b$ in a rear of said mask plate 41, and is attached to a tubular body 44 being axially supported by an axle 46 in a freely rotatable manner.

Figure 6:
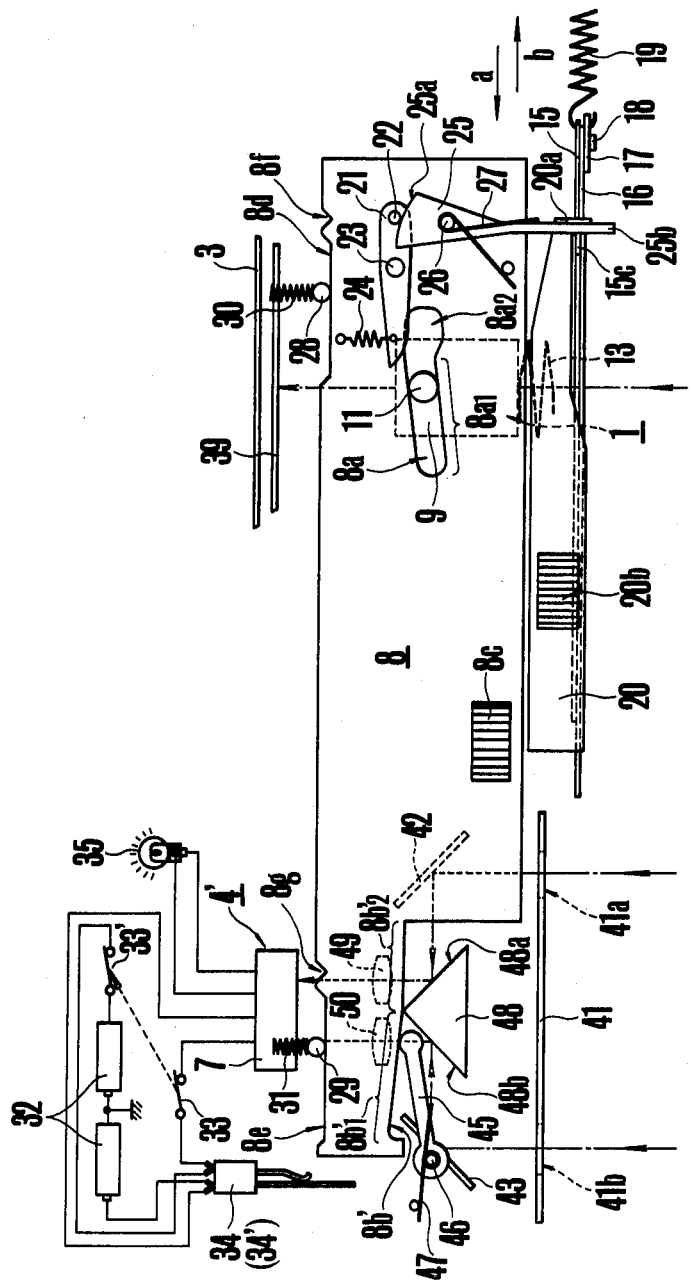
Figure 7:
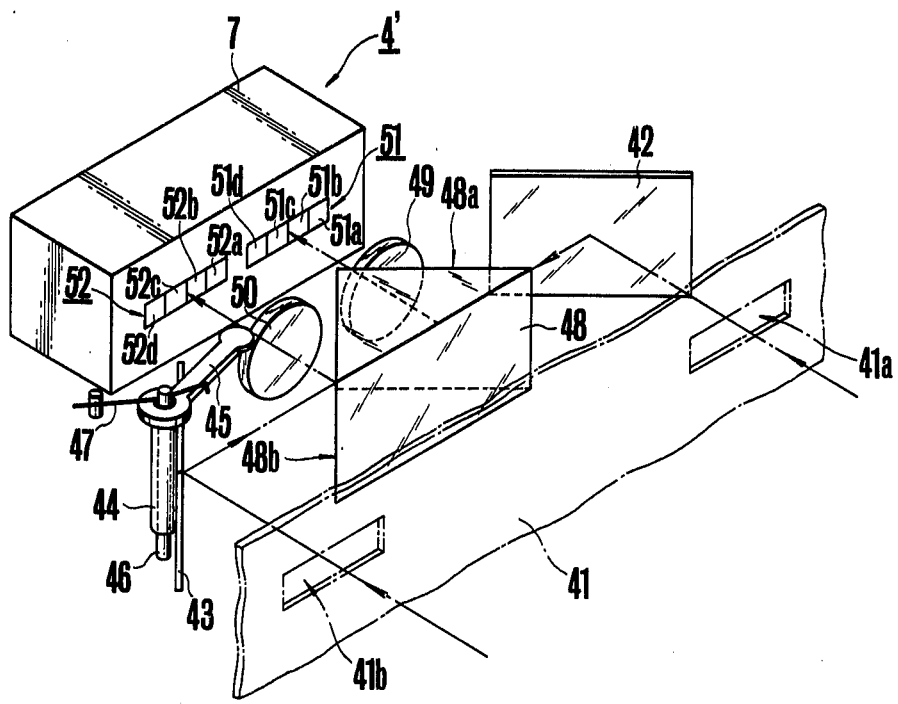

What is shown as 45 is a cam follower attached to said tubular body 44, being so biased to counter-clockwise direction around the axle 46 in FIGS. 6 and 7 that its forward end part contacts with a cam 8$b'$ at the manual setting member 8 for focus adjustment.

Therefore, when the setting member 8 is shifted to a direction of an arrow a or an arrow b in the drawing, the cam follower 45 is controlled by the cam 8$b'$ and rotates around the axle 46, thereby a setting angle of the mirror 43 will be varied.

What is shown as 48 is a reflective prism fixedly positioned between said mirrors 42, 43, and has a first reflective plane 48$a$ to have the light beam reflected from the fixed mirror 42 further reflected to a rear direction, and a second reflective plane 48b to have the light beam reflected from the movable mirror 43 further reflected to a rear direction.

What are shown as 49, 50 are first and second imaging lenses fixedly positioned facing to the first reflective plane 48a and the second reflective plane 48b of said prism 48, wherein the first lens 49 receives the light beam from an object reaching the same through the first opening 41a of the mask plate 41, the fixed mirror 42 and the first reflective plane 48a of the prism 48 and forms an image of said object at a prescribed imaging plane, while the second lens 50 receives the light beam from said object reaching the same through the second opening 41b of the mask plate 41, the movable mirror 43 and the second reflective plane 48b of the prism 48, and forms an image of said object on a prescribed imaging plane.

While a so-called range finding optical system is made by the above, when a camera is pointed to an object in a state that the movable mirror 43 is set at for example 45 degrees in an optical system of said set up, two images formed by the first and second lenses 49, 50 will be so formed as having relative positional parallax corresponding to the distance to said object (of course if an object is at an infinite distance at this time the relative positional parallax between two images is zero).

And in this camera, the setting angle of the movable mirror 43 is so adjusted that the relative positional parallax between two images formed by said first and second lenses 49, 50 becomes zero, by the cam 8b' at the setting member 8, and in this case a tapered part 8b'₁ to adjust the setting angle of the movable mirror 43 and a flat part 8b'₂ provided connectingly to an end of said tapered part 8b'₁ to maintain the movable mirror 43 at 45 degree are formed at the cam 8b' of said setting member 8, respectively against the oblique groove part 8a₁ and the escapement part 8a₂ at the cam groove 8a for focus adjustment, and here, said tapered part 8b'₁ and the oblique groove part 8a₁ are formed with such mutually corresponding relationship that when the relative positional parallax between two images of an object formed by the lenses 49, 50 becomes zero in a course of adjustment of the setting angle of the movable mirror 43, the photographing optical system 1 will be positioned just at an in-focus position against said object.

What is shown as 4' is a detection unit to detect the relative positional parallax between two images formed by said lenses 49, 50, and as will be understood by FIGS. 7 and 8, is consisted of a first array 51 of photo-sensors 51a to 51d and a second array 52 of photo-sensors 51a to 52d, further a signal processing circuit 6' being integrated as much as possible to process the output of said arrays 51 and 52, being encased in a casing 7. And as will be realized from FIG. 7, each array 51, 52 is positioned respectively in alignment with said lenses 49, 50 so as to receive the image formed respectively by the lenses 49, 50.

Details of said signal processing circuit 6' is as shown in FIG. 8, in which what are shown as $D_1$ to $D_8$ are diodes to logarithmically compress the output of each of the photo-sensors 51a to 51d, 52a to 52d at each of the arrays 51, 52, and what is shown as 53 is a differential circuit to obtain the differences of each output being logarithmically compressed at the pairs of photo-sensors 51a–52a, 51b–52b, 51c–52c, 51d–52d in a corresponding relationship positionally at each array 51, 52 (that is ratios of each output at each photo-sensor), and consists of such number of differential amplifiers $DA_1$ to $DA_4$ as corresponding to the number of pairs of photo-sensors.

What is shown as 54 is an absolute value summing circuit to convert into absolute values and add the output of each of the differential amplifiers $DA_1$ to $DA_4$ within said differential circuit 53, and is consisted of a first circuit part consisting of diodes $D_9$ to $D_{12}$ being reversely connected and working against negative input signals and a first operational amplifier $OA_1$, and a second circuit part consisting of diodes $D_{13}$ to $D_{16}$ being forward connected and working on positive input signals. And said operational amplifiers $OA_1$ and $OA_2$ are set at inversely amplifying mode, therefore said absolute value summing circuit 54 outputs such negative signals as ideally reaching zero at a time when the imaging positions of images on each of the arrays 51, 52 matches relatively, therefore the differences of each output at each pair of photo-sensors, 51a–52a, 51b–52b, 51c–52c, 51d–52d, match with each other, and the output of each of the differential amplifiers $DA_1$ to $DA_4$ becomes zero.

Also, the differential circuit 37 and the switching circuit 38 are similar to those in FIG. 4.

And what is shown as 33' is a switch associated with the above mentioned power source switch 33, and 34' is a stopping switch controlled by the setting member 8 together with the above mentioned stopping switch, wherein both switches 33' and 34' are provided within the negative power source circuit as shown in FIGS. 6 and 8, contrary to the switches 33 and 34 being provided within positive power source circuit.

Now, in the above mentioned set up, when the power source switches 33 and 33' are closed in a state a camera is pointed toward a desired object and the setting member 8 for focus adjusting is operated by its operating part 8c within a range of the oblique groove part 8a₁ and the tapered part 8b'₁ of the cam groove 8a and the cam 8b' respectively, that is a range in which the click balls 28, 29 do not be dislocated out of the recessed parts 8d, 8e thereof, the photographing optical system 1 is shifted along its optical axis by the oblique groove part 8a₁, and at a same time the setting angle of the movable mirror 43 is varied by the tapered part 8b'₁, therefore, the imaging position of an image on the second photo-sensor array 52 is varied according to the degree of regulating the photographing optical axis 1. Also, the imaging position on the first photo-sensor array 51 at that time remain unchanged.

Figure 9:
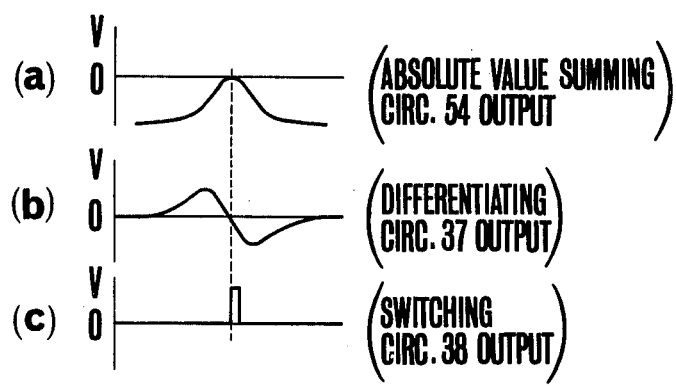

And when the imaging position of an image on the second photo-sensor array 52 becomes relatively corresponding to the imaging position of an image on the first photo-sensor array 51 in a course of said regulating, each of the outputs in each of the pairs of photo-sensors 51a–52a, 51b–52b, 51c–52c, 51d–52d in mutually corresponding relationship positionally at each array 51, 52 becomes to coincide in each case as mentioned above, therefore, the output of each of the differential amplifiers $DA_1$ to $DA_4$ at the differentiation circuit 53 becomes zero, thus the output of the absolute value summing circuit 54 at this time reaches zero level as shown by (a) in FIG. 9. And the output of the differention circuit 37 suddenly changes from positive to negative as shown by (b) in FIG. 9 by this, therefore such signal as shown by (c) in FIG. 9 is outputted from the switching circuit 38 and the lamp 35 is lighted for a short period of time, thus indication will be made to the effect that the imaging positions of images on both photo-sensor arrays 51, 52 relatively correspond, that is the photographing optical system 1 reaches a focused point.

Therefore, when the setting member 8 is immediately stopped at a moment the lamp 35 is lighted, the photographing optical system 1 will be retained at its focused point.

Then, as a release button is operated the shutter 39 is activated and a clear object image is formed on the film 3.

And in an event the focus detection by the detection unit 4 is incomplete in the above mentioned focus adjusting and the indication of focusing by the lamp 35 is not made, the setting member 8 is shifted from its infinite distance setting position further to a direction of an arrow a in the drawing and is set at the above mentioned prescribed position checked by the click-balls 28, 29, then the photographing optical system 1 has its position set according to a diaphragm aperture defined by the diaphragm plates 15, 16 as in the case of the first example, thus such photographing as permissible for practical purposes can be made.

While explanations have been made above for a case when an appropriate hyper focal range is secured by adjusting a position of a photographing optical system according to an exposure aperture size, next explanations will be made on a case when an appropriate hyper focal range is secured by limiting an exposure aperture size to a predetermined size or smaller according to a setting position of a photographing optical system in a case a focus detecting device can not effectively function, referring to FIGS. 10 to 12, as a third example of the present invention. In said drawings, the components indicated with same numbers or symbols as those in FIGS. 1 to 4 are totally same as those in preceeding examples, thus explanations thereof will be omitted so long as not hindering apprehension of this example.

In said drawings, what is shown as 55 is a movable member which associates with the pin 11 connected to the photographing optical system 1 when said setting member 8 for focus adjusting is set at a prescribed position falling outside of its ordinary focus adjusting range, and if the diaphragm plates 15, 16 define a large diaphragm aperture larger than a prescribed size at that time, works on the projection 15c of the diaphragm plate 15, to automatically set the diaphragm aperture to such an aperture value that the maximum hyper focal range is secured against the setting position of the photographing system 1, according to the setting position of said photographing optical system 1 at that time, wherein said member 55 is axially attached on the setting member 8 by an axle 56 in a rotatable manner and is biased to counter clockwise direction around the axle 56 in the drawing that is to such direction as securing the association with the pin 11 by a spring 57. What is shown as 58 is a defining pin to so define the rotating zone of said movable number 55 resisting the biasing power of the spring 57 that said movable member 55 is associated with the pin 11 to make the action on the projection 15c of the diaphragm plate 15 by the tail end 55a thereof effective only when the setting member 8 is set at a prescribed position falling outside of its ordinary focus adjusting zone, wherein said pin 58 is planted on the setting member 8 and has its position so determined as allowing the shifting of the diaphragm plates 15, 16 to the maximum diaphragm aperture defining position in a state said movable member 55 contacts with the pin 58 (shown in FIG. 11).

And the above mentioned cam groove to regulate the photographing optical system 1, in said setting member 8 is formed in this example as a cam groove $8a'$ which comprises a first oblique groove part $8a'_1$ which is similar to the oblique groove part $8a_1$ at the above mentioned example for regulating the photographing optical system 1 from the nearest distance position to the infinite distance position, and a second oblique groove part $8a'_2$ to have said photographing optical system 1 shifted from the infinite distance position again to the near distance position side so that a focusing is made at an appropriate distance (for example 5 meters) being preset, when the setting member 8 is shifted from the infinite distance setting position further to the direction of an arrow a in the drawing until the click-balls 28, 29 drop in and held at notched parts $8f$, $8g$ thereof.

And said movable member 55 is placed at such position as being able to work on the projection 15c of the diaphragm plate 15 in an association with the pin 11 at a time when the setting member 8 is shifted from the infinite distance setting position further to the direction of an arrow a in the drawing, that is when the second oblique groove part $8a'_2$ at the cam groove $8a'$ becomes to engage with the pin 11 connected to said photographing optical system 1, and is so made that when the end part of the second oblique groove part $8a'_2$ comes in contact with the pin 11 and when the setting member 8 is at a position determined and retained by the click-balls 28, 29 (the position shown by FIGS. 10, 12) if the diaphragm aperture size defined by the diaphragm plates 15, 16 is a large one, said aperture size is automatically set at an appropriate diaphragm aperture size according to the set position of the optical system 1 at that time (for example f5.6). Therefore, as the setting member 8 is shifted from the infinite distance setting position further to the direction of an arrow a in the drawing, the photographing optical system 1 is set at a prescribed limited distance position, and at a same time, if the diaphragm plates 15, 16 define the above mentioned large aperture at that time, the diaphragm aperture defined by said diaphragm plates 15, 16 is automatically set at the above mentioned prescribed size and a depth of field is deepened (that is, the maximum hyper focal range is secured against the set position of the photographing optical system 1 at that time), so that an object image with such degree of clearness as permissible for practical purposes is formed at a position corresponding to a film surface.

All other set-ups except those described above are exactly same as in the above mentioned first example.

Next, explanations will be made on a function of a camera having the above mentioned set ups.

First, a photographing aperture opening and a photo-sensing aperture opening are set by shifting the two diaphragm plates 15, 16 by operating the diaphragm regulating member 20 with its operating part 20b, and the power source switch 33 is closed in a state a camera is pointed to a desired object, further the setting member 8 for focus adjusting is operated by its operating member 8c within a range of the oblique groove parts $8a'_1$, $8b_1$ of the cam groove $8a'$, $8b$, that is within a range that the click-balls 28, 29 are not dislocated off the recessed parts $8d$, $8e$ thereof, then the photographing optical system 1 and the focus detection optical system 2 are shifted along their respective optical-axis by said oblique groove parts $8a'_1$, $8b_1$. And when both optical systems 1, 2 reach focusing point against an object at a time of said regulating, the switching circuit 38 in the signal processing circuit 6 of the detection unit 4 is activated and the lamp 35 is lighted for a short period of time as in the above case, indicating that both optical systems 1, 2 are focused. Therefore, if the setting member 8 is stopped immediately at a time when the lamp 35 is lighted, both optical systems 1, 2 are retained at their respective focusing points (a state shown in FIG. 11). Thereafter when a release button not being shown in the drawing is operated the shutter 39 is activated and clear object image will be formed on the film 3.

On the other hand, when the focus detection by the detection unit 4 is incomplete at a time of said focus adjusting and an indication of focusing state by the lamp 35 is not done, the setting member 8 is shifted from its infinite distance setting position further to the direction of an arrow a in the drawing. By this, said setting member 8 is retained at said position as the click-balls 28, 29 drop in the notched parts $8f$, $8g$ respectively thereof, and the oblique groove part $8a_2$ and the parallel groove part $8b_2$ at the cam grooves $8a'$ and $8b$ come to engage with the pin 11 connected to the photographing optical system 1 and the pin 12 connected to the focus detection optical system 2 respectively, and at a same time the movable member 55 engages with the pin 11, thus the photographing optical system 1 is set at the above mentioned limited distance position (a position corresponding to 5 meters) being prescribed, and if the diaphragm plates 15, 16 at that time define the large diaphragm aperture size above said prescribed size (f5.6), the diaphragm aperture being defined by said diaphragm plates 15, 16 is automatically set at the above mentioned prescribed size that is, such a size as securing the maximum hyper focal range, thereby depth of field is deepened and an object image with such degree of sharpness as permissible for practical purposes can be obtained at a position corresponding to a film surface.

Of course, if the diaphragm aperture defined by the diaphragm plates 15, 16 at that time is a small one (for example f8, f11, f16, etc.) below the prescribed diaphragm aperture size mentioned above by operating the diaphragm regulating member 20, the above mentioned action of the movable member 55 against the diaphragm plate 15 becomes nulified, thus the set diaphragm aperture size will not be varied at all.

That is, in this camera, assuming from the data mentioned in the explanations on the first example that the focal length of the photographing optical system 1 is 26 mm, and the regulated position of the photographing optical system 1 at a time when the setting member 8 is set at the above mentioned prescribed position, is a position corresponding to 4.8 meters, and further the aperture value to be limited by the movable member 55 at that time is f5.6, a hyper focal range of at least 2.4 meters to infinite will be secured when the setting member 8 is set at a prescribed position defined by the click-balls 28, 29.

Figure 10:
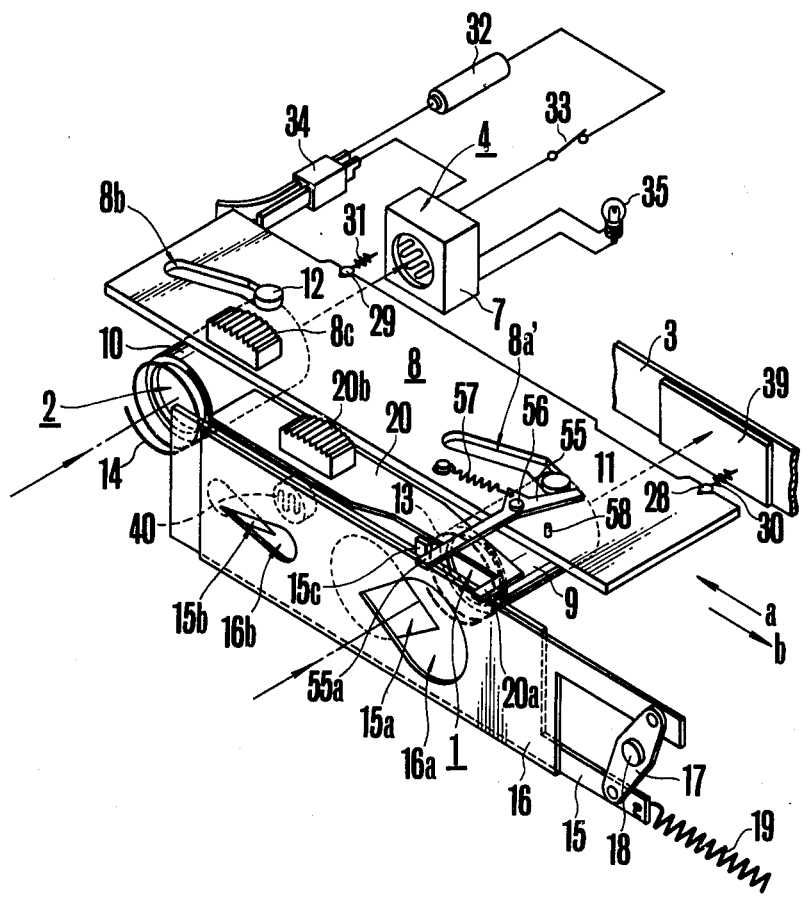
Figure 11:
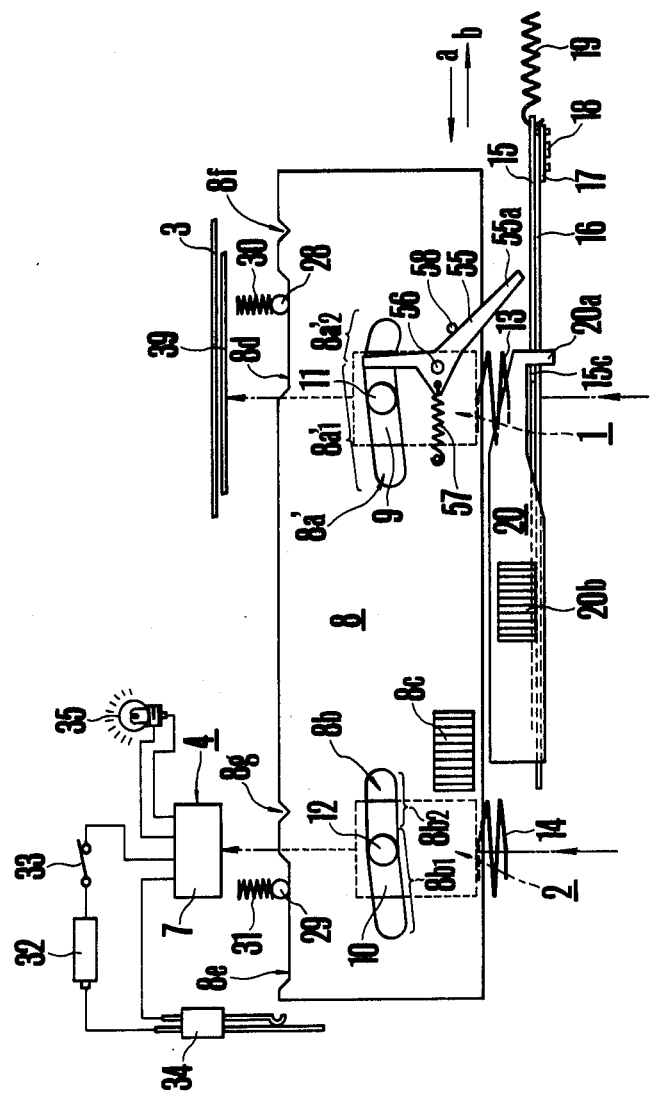
Figure 12:
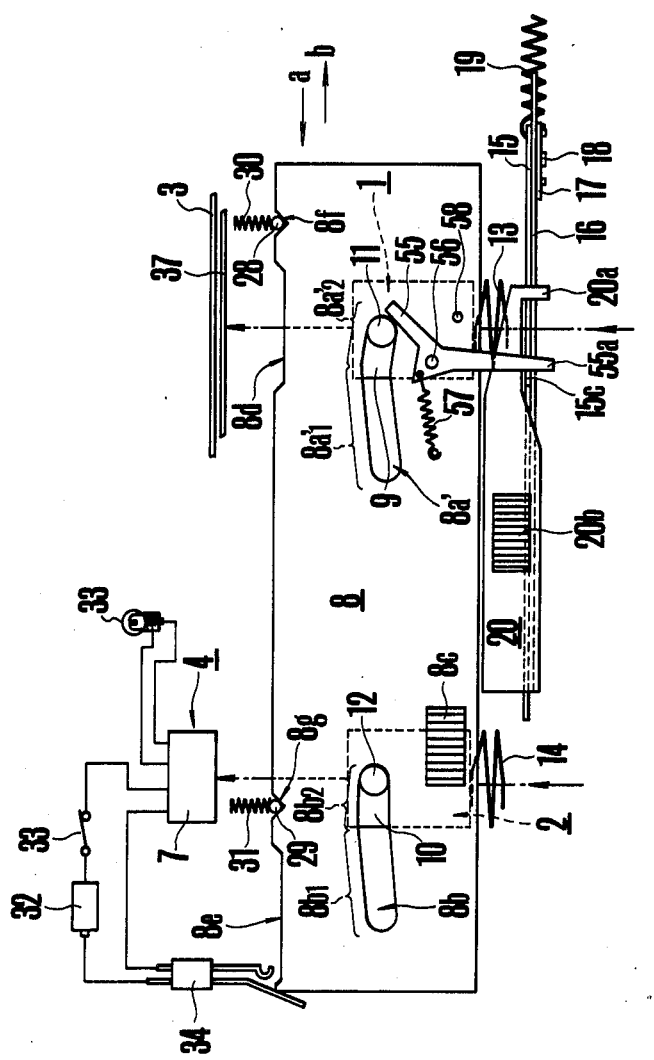
Figure 13:
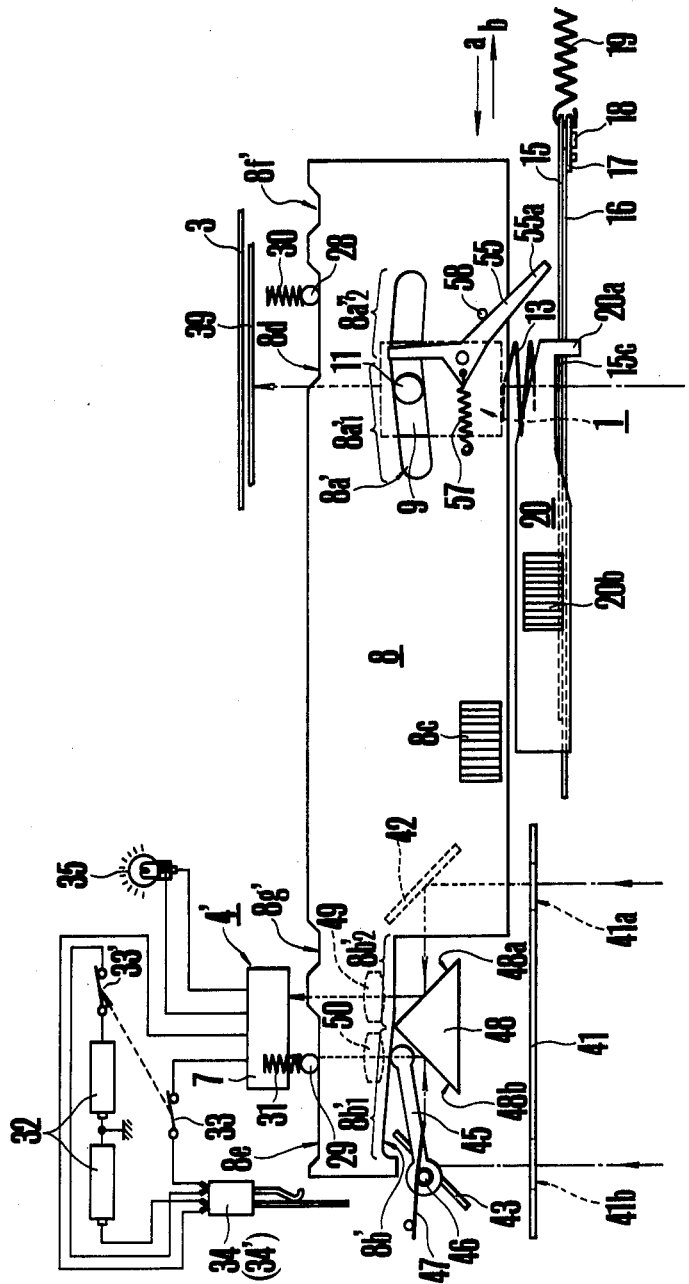
FIG. 13 shows a fourth example of a camera according to the present invention, in which similar improvements as in said third example are applied to a camera having similar passive range finding type focus detection device as shown in FIGS. 7 and 8, wherein an internal structure of said camera is viewed from its upper direction in a same state as in FIG. 11.

As has been explained above in the third example of the present invention shown in FIGS. 10 to 12, at a time when the focus detection device does not function properly, the photographing optical system is set at a prescribed position, and if the diaphragm aperture size at a diaphragm device at that time is set at the large diaphragm aperture size above a prescribed size, the depth of field is deepened by automatically setting said aperture size at such prescribed size as for example securing the maximum hyper focal range against the set position of the photographing optical system, thus allowing such photographing as permissible for practical purposes in most cases, and particularly its structure is simple therefore it can be made with a low cost, thus it can secure very useful effects as it is applied to a middle class camera.

Lastly, in a fourth example of the present invention, similar improvements as in the third example are applied to a camera having a focus detecting device of passive range finding type shown in FIGS. 7 and 8, in short, and as its set up and function are same as those of preceeding examples, the detailed explanations thereof will be omitted. But what is different from the third example is that the setting member 8 is made operable at a predetermined "range" falling outside of an ordinary focus adjusting range in this fourth example while the setting member 8 is so made as can be set at a predetermined "position" falling outside of its ordinary focus detecting range in the third example.

That is as shown in the drawing, the above mentioned notched parts $8f$, $8g$ (shown in FIGS. 10 to 12) at the setting member 8 are formed here as recessed parts $8f'$, $8g'$ having certain width to make said setting member 8 shiftable in a further free manner within a prescribed range, and the second oblique groove part at the cam groove $8a'$ for focus adjusting of the photographing optical system 1 is formed as an oblique groove part $8a''_2$ which can adjust the photographing optical system 1 for example between a position corresponding to 4.8 meters to a position corresponding to 2.4 meters, against the range of said recessed part $8f'$, $8g'$. And further in this case, the movable member 55 is so adjusted that the exposure aperture size to be regulated by the diaphragm plates 15, 16 can be limited for example to below f5.6 when the photographing optical system 1 is at a position corresponding to 4.8 meters, and to below f11 when the optical system 1 is at a position equivalent to 2.4 meters, against the position adjustment of the photographing optical system by the above mentioned second oblique groove part $8a''_2$.

That is, this is based on the fact that for example when a lens having a focal length of 26 mm is at a position corresponding to 4.8 meters an exposure aperture value which can secure a hyper focal range thereof is f5.6 or below, also when a same lens is at a position corresponding to 2.4 meters, an exposure value which can secure a hyper focal range thereof is f11 or below, as has been explained above.

As has been explained above, in a camera shown as the fourth example, when the setting member 8 is set at the above mentioned predetermined range, the exposure aperture value to be regulated by the diaphragm plates 15, 16 at every regulating of the photographing optical system 1 will be limited every time to a value to secure an appropriate hyper focal range against the set position of said photographing optical system 1 or below.

As has been explained above, the present invention has such set up, as a camera having an automatic focus detecting device and further a coordinating means for coordinating the focus and exposure aperture adjustments, that a manually operable focus adjusting means is made as can be set at a predetermined position or range falling outside of its ordinary focus adjusting range, and at a same time said coordinating means is connected operatively to said focus adjusting means and said coordinating means can so function as to secure an appropriate depth of field (i.e. hyper focal range) only when the focus adjusting means is set at said predetermined position or range. And by this since the effective focus detecting range of the focus detecting device is secured at a range from its nearest distance allowing photographing to infinite in an ordinary case, such shortcomings in this kind of camera as mentioned above that is a significance of providing an automatic focus detecting device is halved as a coordinating means is provided are completely eliminated, and an automatic focus detecting device and a coordinating means can have their respective function being independent from each other fully utilized, therefore the function of this kind of camera having an automatic focus detecting device and a coordinating means for coordinating the focus and exposure adjustments can be enhanced to its fullest extent.

And at a same time particularly, since its structure is quite simplified, it can be made with very low cost, thus it is very useful in practical use, for example, as applied to a pocket size camera or an ordinary middle class camera.

What is claimed is:

1. A camera comprising:
   (A) a photo-taking lens system adjustable along an optical axis so as to form an image of an object on a predetermined film plane;
   (B) focus adjusting means operatively coupled to said lens system to adjust the lens system along the optical axis, said focus adjusting means having a normal adjusting range and at least one predetermined position beyond the normal adjusting range and being shiftable between the range and the position;
   (C) a diaphragm device for regulating an exposure aperture aligned with said lens system; and
   (D) coordinating means for coordinating the focus adjustment of the lens system and the exposure aperture adjustment of the diaphragm device according to a predetermined functional relationship to secure an appropriate depth of field, said coordinating means being operatively associated with said focus adjusting means and operating so as to coordinate the focus and exposure adjustments only when said focus adjusting means is set to said predetermined position.

2. A camera according to claim 1, wherein said coordinating means includes means for adjusting the position of said photo-taking lens system in correspondence to the adjusted size of said exposure aperture according to said predetermined functional relationship.

3. A camera according to claim 1, wherein said coordinating means includes means for limiting the exposure aperture size to be adjusted by said diaphragm device to a predetermined size in correspondence to the set position of said photo-taking lens system according to said predetermined functional relationship.

4. A camera according to claim 1, further comprising:
   an automatic focus detecting device for detecting the focusing condition of said photo-taking lens system to the object, and
   de-activating means electrically coupled to said detecting device for de-activating the detecting device, said de-activating means being operatively associated with said focus adjusting means and being operated so as to de-activate the detecting device when said focus adjusting means is set to said predetermined position.

5. A camera comprising:
   (A) a photo-taking lens system adjustable along an optical axis so as to form an image of an object on a predetermined film plane;
   (B) focus adjusting means operatively coupled to said lens system to adjust the lens system along the optical axis, said focus adjusting means having a normal adjusting range and at least one predetermined position beyond the normal adjusting range and being shiftable between the range and the position;
   (C) a diaphragm device for regulating an exposure aperture aligned with said lens system; and
   (D) setting means for resetting said lens system to a hyper focal distance position in relation to the adjusted size of the exposure aperture adjusted by said diaphragm device, said setting means being operatively associated with said focus adjusting means and operating so as to reset the lens system to said hyper focal distance position in relation to the adjusted exposure aperture size only when said focus adjusting means has been set to said predetermined position.

6. A camera according to claim 5, wherein said setting means includes a first member movable to a position corresponding to the adjusted exposure aperture size adjusted by said diaphragm device and a second member movable to a position representing the hyper focal distance position of said lens system in relation to said adjusted exposure aperture size, according to the position of said first member;
   thereby the lens system is reset to the hyper focal distance position in relation to the adjusted exposure aperture size through said second member.

7. A camera according to claim 5, further comprising:
   an automatic focus detecting device for detecting the focusing condition of said photo-taking lens system to the object, and
   de-activating means electrically coupled to said detecting device for de-activating the detecting device, said de-activating means being operatively associated with said focus adjusting means and being operated so as to de-activate the detecting device when said focus adjusting means is set to said predetermined position.

8. A camera comprising:
   (A) a photo-taking lens system adjustable along an optical axis so as to form an image of an object on a predetermined film plane;
   (B) focus adjusting means operatively coupled to said lens system to adjust the lens system along the optical axis, said adjusting means having a normal adjusting range and at least one predetermined position beyond the normal adjusting range and being shiftable between the range and the position;
   (C) a diaphragm device for regulating an exposure aperture aligned with said lens system; and
   (D) limiting means for limiting the exposure aperture size to be adjusted by said diaphragm device to such a predetermined size as to secure an appropriate hyper focal range in relation to the set position of said lens system, said limiting means being operatively associated with said focus adjusting means so as to limit the exposure aperture size to said predetermined size only when said focus adjusting means is set to said predetermined position.

9. A camera according to claim 8, wherein said limiting means includes a movable member engageable with said phototaking lens system and movable to a position representing said predetermined exposure aperture size according to the set position of the lens system, to as to limit the exposure aperture size to be adjusted by said diaphragm means to said predetermined size.

10. A camera according to claim 9, further comprising;
an automatic focus detecting device for detecting the focusing condition of said photo-taking lens system to the object, and
de-activating means electrically coupled to said detecting device for de-activating the detecting device, said de-activating means being operatively associated with said focus adjusting means and being operated so as to de-activate the detecting device when said focus adjusting means is set to said predetermined position.

11. A camera comprising:
(A) a photo-taking lens system adjustable along an optical axis so as to form an image of an object on a predetermined film plane;
(B) focus adjusting means operatively coupled to said lens system to adjust the lens system along the optical axis;
(C) a diaphragm device for regulating an exposure aperture aligned with said lens system;
(D) limiting means for limiting the exposure aperture size to be adjusted by said diaphragm device to such a predetermined size as to secure an appropriate hyper focal range in relation to the set position of said lens system, wherein said limiting means includes a movable member engageable with said photo-taking lens system and movable to a position representing said predetermined exposure aperture size according to the set position of the lens system; thereby the exposure aperture size to be adjusted by the diaphragm device is limited to said predetermined size in relation to the set position of the lens system through said movable member;
wherein said focus adjusting means has a normal adjusting range and at least one predetermined position beyond the normal adjusting range and is shiftable between the range and the position; and wherein said movable member is operatively associated with said focus adjusting means and operates so as to limit the exposure aperture size to said predetermined size only when said focus adjusting means is set to said predetermined position.

12. A camera according to claim 11 further comprising:
an automatic focus detecting device for detecting the focusing condition of said photo-taking lens system to the object, and
de-activating means electrically coupled to said detecting device for de-activating the detecting device, said de-activating means being operatively associated with said focus adjusting means and being operated so as to de-activate the detecting device when said focus adjusting means is set to said predetermined position.

13. A camera comprising:
(A) a photo-taking lens system adjustable along an optical axis so as to form an image of an object on a predetermined film plane;
(B) focus adjusting means operatively coupled to said lens system to adjust the lens system along the optical axis, said adjusting means having a normal adjusting range and a secondary adjusting range beyond the normal adjusting range and being shiftable between the ranges;
(C) a diaphragm device for regulating an exposure aperture aligned with said lens system; and
(D) limiting means for limiting the exposure aperture size to be adjusted by said diaphragm device to such predetermined sizes as to secure appropriate hyper focal ranges in relation to the set positions of said lens system, said limiting means being operatively associated with said focus adjusting means so as to limit the exposure aperture size to said predtermined sizes only when said focus adjusting means is set within said secondary adjusting range.

14. A camera according to claim 13, wherein said limiting means includes a movable member engageable with said phototaking lens system and movable to positions representing said predetermined exposure aperture sizes according to the set positions of the lens system so as to limit the exposure aperture size to be adjusted by said diaphragm means to said predetermined sizes.

15. A camera according to claim 14, further comprising:
an automatic focus detecting device for detecting the focusing condition of said photo-taking lens system to the object; and
de-activating means electrically coupled to said detecting device for de-activating the detecting device, said de-activating means being operatively associated with said focus adjusting means and being operated so as to de-activate the detecting device when said focus adjusting means is shifted to said secondary range.

* * * * *